(12) United States Patent
Boag et al.

(10) Patent No.: US 10,010,938 B2
(45) Date of Patent: Jul. 3, 2018

(54) METHOD FOR HEATING A SLURRY SYSTEM (71) Applicant: Nanoco Technologies Ltd., Manchester (GB)

(72) Inventors: Neil Boag, Mytholmroyd W. (GB); Andrew Gooda, Chester (GB)

(73) Assignee: Nanoco Technologies Ltd., Manchester (GB)

( * ) Notice: Subject to any disclaimer, the term of this patent is extended or adjusted under 35 U.S.C. 154(b) by 328 days.

(21) Appl. No.: 14/520,129

(22) Filed: Oct. 21, 2014

(65) Prior Publication Data
US 2017/0074460 A1    Mar. 16, 2017

Related U.S. Application Data

(60) Provisional application No. 61/894,264, filed on Oct. 22, 2013.

(51) Int. Cl.
*B22F 9/24* (2006.01)
*B01J 19/00* (2006.01)
(Continued)

(52) U.S. Cl.
CPC ............ *B22F 9/24* (2013.01); *B01J 4/008* (2013.01); *B01J 8/001* (2013.01); *B01J 8/0035* (2013.01); *B01J 8/20* (2013.01); *B01J 19/0013* (2013.01); *B01J 19/0066* (2013.01); *B01J 19/18* (2013.01); *B01J 19/2465* (2013.01); *B05C 11/1042* (2013.01); *B22F 9/20* (2013.01); *B22F 9/22* (2013.01); *F17D 1/18* (2013.01);
(Continued)

(58) Field of Classification Search
CPC ......... Y10T 137/6416; Y10T 137/6606; Y10T 137/657; Y10T 137/85954; B22F 9/20; B22F 9/22; B22F 9/24; F17D 1/18; B01J 19/18; B01J 19/0066; B05C 11/1042
See application file for complete search history.

(56) References Cited

U.S. PATENT DOCUMENTS 4,678,119 A * 7/1987 Doyle .................. B05B 7/24
239/124
6,012,608 A * 1/2000 Ridenour ............. A01K 7/02
222/146.5
(Continued)

FOREIGN PATENT DOCUMENTS

WO WO 2013058159 A1 * 4/2013 ............ C09D 7/14

*Primary Examiner* — Atif Chaudry
(74) *Attorney, Agent, or Firm* — Blank Rome, LLP (57) ABSTRACT

A reservoir for one or more chemical reactants has means for heating the reactants and optional means for stirring the reactants. A pumped reactant feed line and a return line provide fluid communication between the reservoir and a 4-way valve system. The 4-way valve system is also in fluid communication with a reactor vessel and a source of inert gas for purging the system. In a first state, the 4-way valve provides fluid communication between the reservoir and the reactor. In a second state, the 4-way valve provides a continuous circulation path for the heated reactants from the reservoir, to the valve system, and back to the reservoir via the return line. In a third state, the 4-way valve provides a fluid pathway for purging the reactor with inert gas. In a fourth state, the 4-way valve provides a fluid pathway for purging the reservoir with inert gas.

20 Claims, 5 Drawing Sheets (51) Int. Cl.
*F17D 1/18* (2006.01)
*B05C 11/10* (2006.01)
*B22F 9/22* (2006.01)
*B01J 19/18* (2006.01)
*B22F 9/20* (2006.01)
*B01J 8/20* (2006.01)
*B01J 19/24* (2006.01)
*B01J 4/00* (2006.01)
*B01J 8/00* (2006.01)

(52) U.S. Cl.
CPC .............. *B01J 2208/003* (2013.01); *B01J 2208/00061* (2013.01); *B01J 2208/00283* (2013.01); *B01J 2208/00415* (2013.01); *B01J 2208/00539* (2013.01); *B01J 2208/00548* (2013.01); *B01J 2219/002* (2013.01); *B01J 2219/0011* (2013.01); *B01J 2219/0024* (2013.01); *B01J 2219/00063* (2013.01); *B01J 2219/00065* (2013.01); *B01J 2219/00069* (2013.01); *B01J 2219/0081* (2013.01); *B01J 2219/00114* (2013.01); *B01J 2219/00135* (2013.01); *B01J 2219/00164* (2013.01); *B01J 2219/00211* (2013.01); *B01J 2219/00231* (2013.01); *Y10T 137/6416* (2015.04); *Y10T 137/6579* (2015.04); *Y10T 137/6606* (2015.04); *Y10T 137/85954* (2015.04)

(56) References Cited

U.S. PATENT DOCUMENTS

| | | | |
|---|---|---|---|
| 6,179,912 B1 * | 1/2001 | Barbera-Guillem | B82Y 30/00 117/68 |
| 8,524,365 B2 | 9/2013 | O'Brien et al. | |
| 2005/0093211 A1 * | 5/2005 | Shiraishi | B22F 1/0018 266/170 |
| 2005/0233487 A1 * | 10/2005 | Liu | B82Y 10/00 438/29 |
| 2006/0160964 A1 | 7/2006 | Gebhart et al. | |
| 2008/0264208 A1 * | 10/2008 | Jacobsen | B22F 9/28 75/619 |
| 2014/0291577 A1 * | 10/2014 | Ugajin | C09D 7/14 252/182.33 |

* cited by examiner

METHOD FOR HEATING A SLURRY SYSTEM

CROSS-REFERENCE TO RELATED APPLICATIONS

This application claims the benefit of U.S. Provisional Application No. 61/894,264 filed on Oct. 22, 2013.

STATEMENT REGARDING FEDERALLY SPONSORED RESEARCH OR DEVELOPMENT

Not Applicable

BACKGROUND OF THE INVENTION

1. Field of the Invention

The present invention generally relates to the transportation of heated reagents to a chemical reactor. More particularly, it relates to the transportation of heated reagents in the synthesis of nano-particle-based materials.

2. Description of the Related Art Including Information Disclosed Under 37 CFR 1.97 and 1.98

Quantum dots (QDs) consist of tiny particles (nanoparticles) of semiconductor material with dimensions on the order from 2 to 50 nanometers. Because of their size these particles have unique electrical properties, one of which is the emission of visible light under excitation. The color of the light emitted is dependent upon the size of the QD particle. By precisely controlling the size of the particles during manufacture, the color of the light emitted may also be precisely controlled, making quantum dots useful in commercial applications such as optical and electronic devices and other applications ranging from biological labelling, photovoltaics, catalysis, biological imaging, LEDs, general space lighting, and electroluminescent displays amongst many new and emerging applications.

A method of QD manufacture involves producing nanoparticles from chemical precursors in the presence of a molecular cluster compound under conditions whereby the molecular cluster acts as a prefabricated seed template for the formation of a core semiconductor material. One or more semiconductor shell layers may be grown on the core material. See, for example, U.S. Pat. No. 8,524,365 the entirety of which is hereby incorporated by reference.

Figure 1:
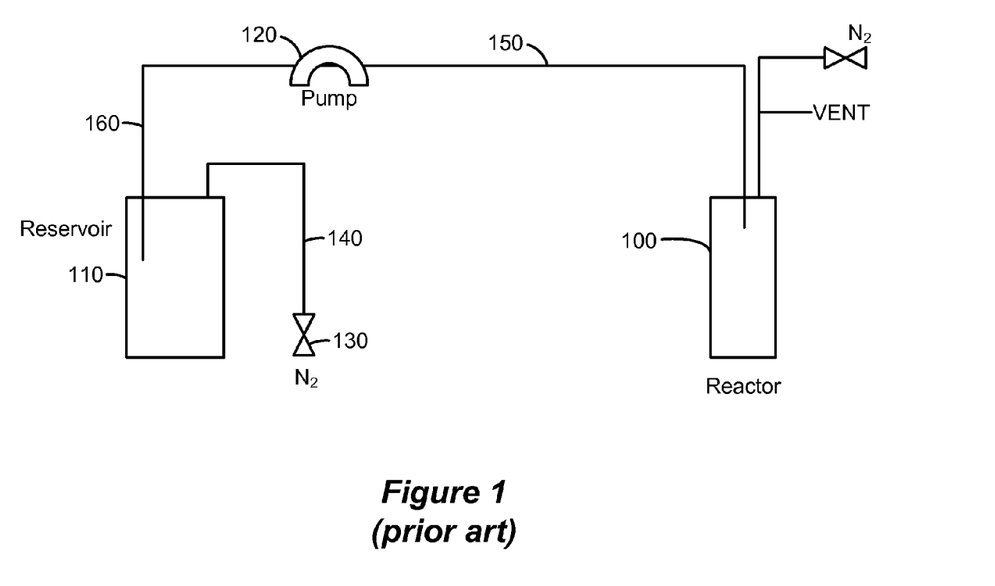
FIG. 1 is a schematic diagram of a method of delivering a heated slurry to a chemical reactor in accordance with the prior art.

As shown in the system of FIG. 1, during QD manufacture, reactants in a reservoir 110 may be added to a reactor 100 by use of a pump 120. The reaction (or individual reactants) may be sensitive to the presence of oxygen in the system, and an inert gas such as nitrogen, for example, may be used to purge the system. The inert gas may be introduced to the system via a purge line 140 and opening a gas source valve 130. Reactants may be in the form of a slurry. In some cases, heating the slurry may cause it to form a solution, in whole or in part. Heating a slurry of reactants may make the slurry more uniform prior to its addition to a reactor.

Line jacketing is commonly used to maintain the temperature of a liquid or slurry within such delivery systems. In these systems the jacket typically contains an electrical heating element to warm the liquid or slurry by electrical conduction via the pipe or the jacket, for example, using heating tape or heating cable.

Delivery lines may be made of a transparent material such as glass to allow viewing of the reactants and observation and detection of blockages, for example. However, jacketed heating means may obstruct the view of the transparent lines, and prevent an operator from seeing if and where a blockage might occur. Thus, a method to heat the slurry within the lines and without obscuring the view of the flow through the system is needed.

BRIEF SUMMARY OF THE INVENTION

A reservoir for one or more chemical reactants has means for heating the reactants and optional means for stirring the reactants. A pumped reactant feed line and a return line provide fluid communication between the reservoir and a 4-way valve system. The 4-way valve system is also in fluid communication with a reactor vessel and a source of inert gas for purging the system.

In a first state, the 4-way valve provides fluid communication between the reservoir and the reactor. In a second state, the 4-way valve provides a continuous circulation path for the heated reactants from the reservoir, to the valve system, and back to the reservoir via the return line. In a third state, the 4-way valve provides a fluid pathway for purging the reactor with inert gas. In a fourth state, the 4-way valve provides a fluid pathway for purging the reservoir with inert gas.

Actuation of the 4-way valve, the pump, heating means, and stirring means may be manually controlled, timer controlled or automatically controlled in response to various temperature, pressure, flow and/or mass sensors.

DETAILED DESCRIPTION OF THE INVENTION

An apparatus and method to transport and warm a fluid such as a slurry without the use of jacketing is disclosed. The apparatus may include a four-way, two-valve system to flow the fluid through the system. Upon passing through the valves, the fluid may either be transferred to a set of return lines that are connected to a heating system in a circulation mode, or flow the fluid through the addition system of lines in an addition mode and depositing the fluid in a reactor.

Figure 2A:
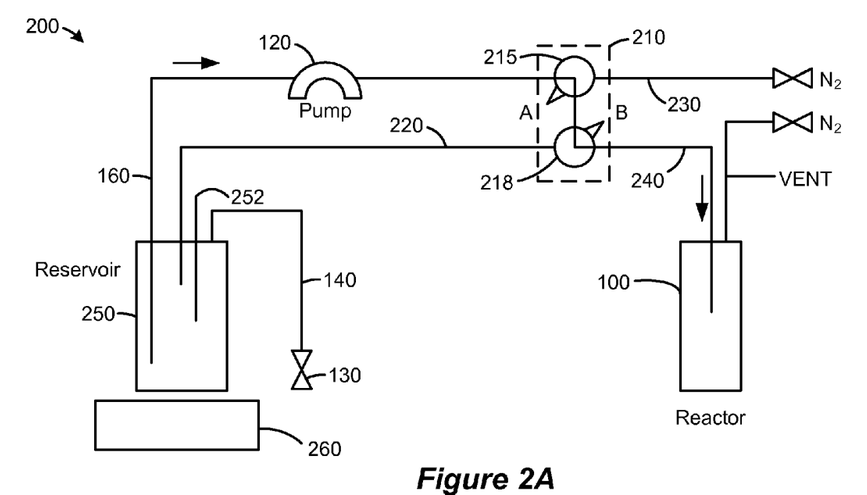
FIG. 2A is a schematic diagram of an embodiment of the invention operating in an addition mode.

FIG. 2A shows an embodiment of the delivery system 200 in addition mode. Here, fluids (slurries or liquids) are transported from a reservoir 250 through a valve system 210 and added into a reactor 100. The amount of fluid added to the reactor 100 may be controlled by timing the activation of a pump 120 that may be used to produce fluid flow. The pump 120 may be any positive displacement pump such as a peristaltic pump or a diaphragm pump to assist in maintaining a closed system. Other methods, discussed further below, may also be used to control the quantity of fluid added to the reactor 100.

The valve system 210 may be a four-way valve system comprising two three-port valves 215, 218 having a port in common. Valves 215, 218 may each have an A and B position as shown. The valves may be manually engaged, but are preferably controlled via an automated control system (not shown). To configure the valves in addition mode, valve 215 may be placed in the A position and valve 218 may be placed in the B position.

The delivery system 200 may have an additional purge line 230 which may be used to purge the reactor, for example, prior to any additions when both valves are set to position B. The delivery system 200 may be purged by introducing an inert gas to the purge lines 140 and 230, and by the control of valve 215 and valve 218. The system may be purged by providing positive pressure of the inert purging gas and cycling the valve system 210. Alternatively, valve 215 may be set to position B and valve 218 set to position A and inert gas from purge line 230 may be routed to reservoir 250 via return line 220. In such case, reservoir 250 would be equipped with a vent (not shown).

Figure 2B:
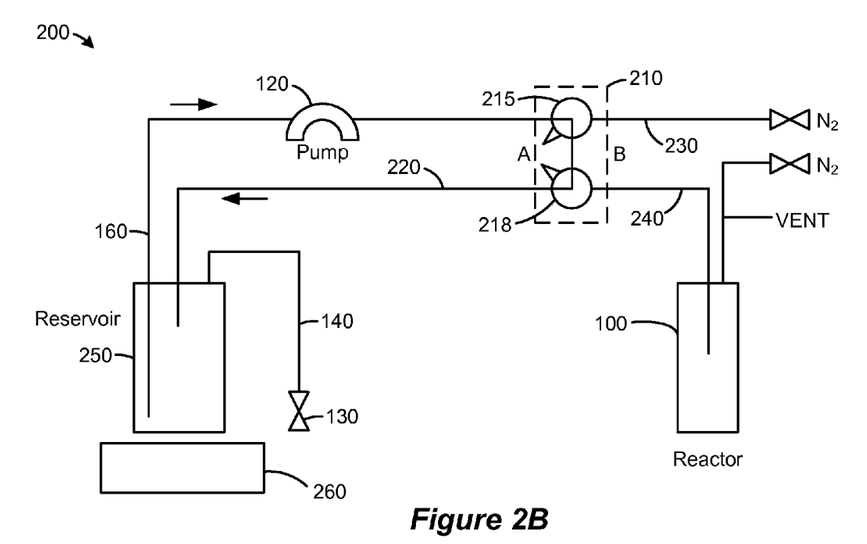
FIG. 2B is a schematic diagram of an embodiment of the invention operating in a circulation mode.

To keep the fluid warm, the fluid may be circulated through the heating system. FIG. 2B shows the delivery system 200 in circulation mode. In circulation mode, valve 215 and valve 218 are both in the A position. This directs the flow of the fluid through a return line 220 to the heating system. The heating system may comprise a reservoir 250 and a heating element 260. The reservoir 250 may be any vessel known in the art. For example, reservoir 250 may be a clear glass vessel such as a modified conical flask, for example, configured so that the delivery fluid may pass into and out of the reservoir 250 without exposure to oxygen and/or moisture, i.e., a closed system. The reservoir 250 may be fitted with a magnetic stirrer bar, and positioned on top of a heating element 260 such as a stirrer hot plate, for example. The stirring rate and temperature of heating element 260 may be selected to achieve values appropriate for the chosen fluid.

In one embodiment, the fluid temperature may be controlled manually via heating element 260. As the fluid passes from return line 220 into reservoir 250, it may be heated and stirred (to ensure uniform heating, for example). As the fluid continues to flow into reservoir 250, the warmed delivery fluid in reservoir 250 may be circulated back into supply line 160, towards four-way valve system 210. The inlet of the supply line 160 may be positioned at or near the bottom of reservoir 250 to ensure that supply line 160 receives fluid that has been warmed and mixed. On reaching four-way valve system 210, the delivery fluid may be directed through to the addition system or back through the heating system.

Figure 2C:
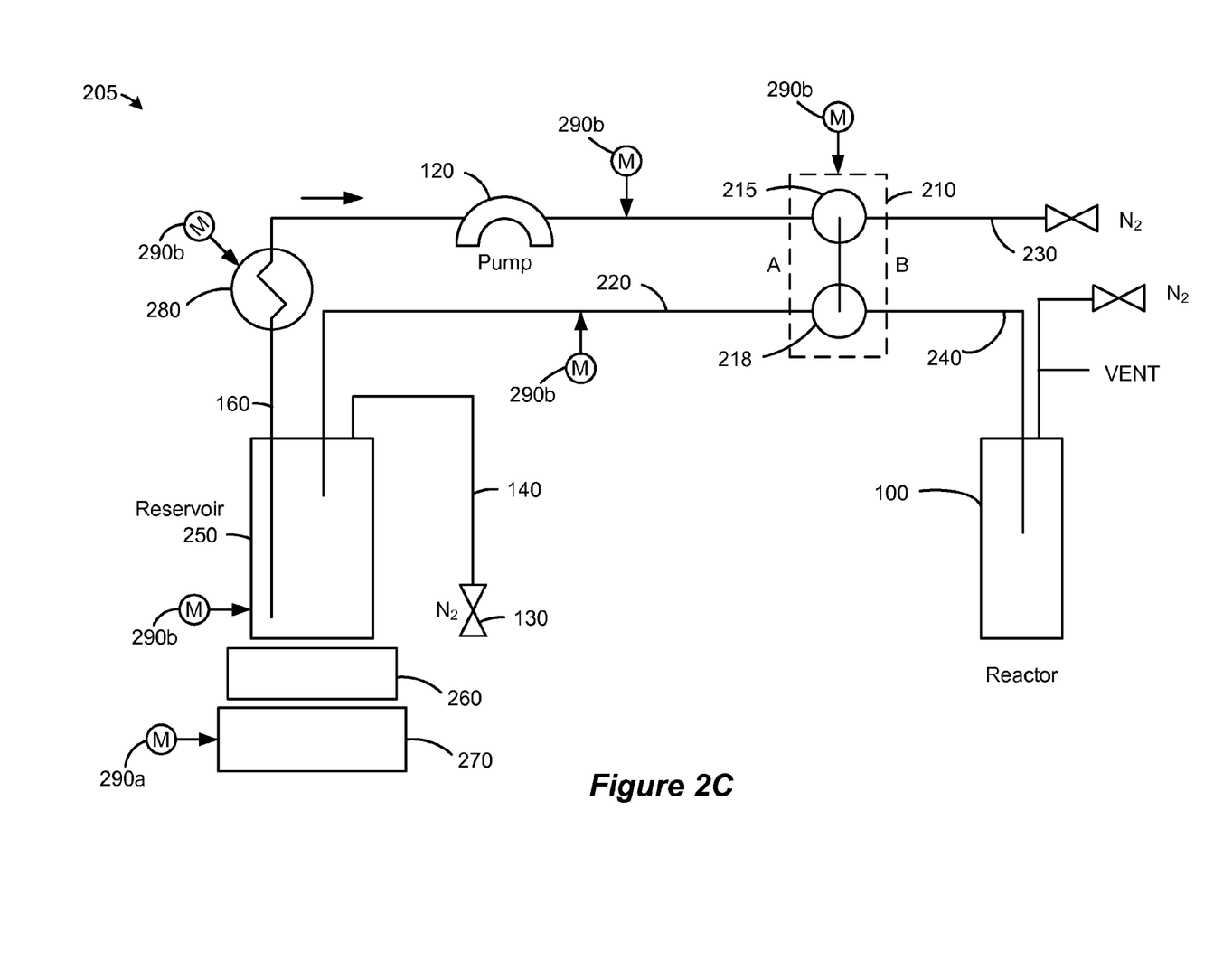
FIG. 2C is a schematic diagram of alternative embodiments of the invention.

The state of valve system 210, heating element 260, stirring rate, and pump 120 may be controlled by a timer and/or controlled by an automated control system, for example, a processor-based system. Further, the automated control system may take input measurements at various places in the delivery system 205 as shown in FIG. 2C. FIG. 2C shows delivery system 205 which includes other configurations of the system 200. Namely, scale 270, heat exchanger 280, and various measurement points 290 may be added to delivery system 200. Alternatively, as illustrated in FIG. 2A, the temperature may be controlled by an automatic system utilizing a thermocouple 252 or other temperature-sensing means immersed in the contents of reservoir 250.

In one embodiment, the scale 270 may measure the amount of fluid (by mass) that may be added to the reactor 100. The scale 270 may comprise a measuring instrument 290a that may be used to measure the weight of the fluid in the reservoir 260. This measurement may also be used as feedback to the automated control system to control the pump 120. Input may be provided to the pump 120 to precisely control the flow of the fluid by receiving a signal from the automated control system. For example, the automated control system may engage the pump 120 until the measurement instrument 290a indicates that a certain weight of fluid has been pumped into the reactor 100.

Precise volumes of fluid may also be delivered by controlling the pump 120. For example, if pump 120 is a peristaltic pump, a certain number of revolutions (or partial revolutions) may be controlled by the automated control system to supply a certain amount of delivery fluid. This may be useful during the addition mode, especially if the density of the fluid is known and homogeneous and where the amount of fluid introduced to the reactor 100 is important.

The temperature of the delivery fluid may also be monitored at a number of points in the system 205 as feedback to the automated control system. For example, temperature measuring instrument 290b may measure the temperature of the fluid in the reservoir 250, the heat exchanger 280, any of the delivery lines (e.g., lines 160, 220, or 240), the valve system 210, or any other point where the temperature of the fluid may be taken.

In another embodiment, system 205 may comprise heat exchanger 280. In certain embodiments, heat exchanger 280 may replace heater 260. Heater exchanger 280 may employ a heat transfer liquid to heat the solution or slurry as it is transferred from reservoir 250. Heat exchanger 280 may also be controlled, for example, by the automated control system using feedback from one or more of the temperature sensors 290b. In this embodiment, a temperature measurement of the system 205 may be fed back to the automated control system to control the heat exchanger. In this embodiment, pump 120 may run continuously until fluid is needed to be added to the reactor 100.

As shown in flow diagram 300 (FIG. 3) and diagram 400 (FIG. 4), fluid flow in the systems 200, 205 (see FIGS. 2A/2B and 2C, respectively) may also controlled by the use of a timer such that, after a certain time interval, the flow of the delivery fluid is circulated (i.e., in circulation mode) to the heating system for a certain time interval to warm the delivery fluid and circulation may be halted for a second time interval. This circulation process may then be repeated. By selecting appropriate time intervals the system may be used to ensure that the fluid does not cool and solidify, to prevent blocking of the lines.

Figure 3:
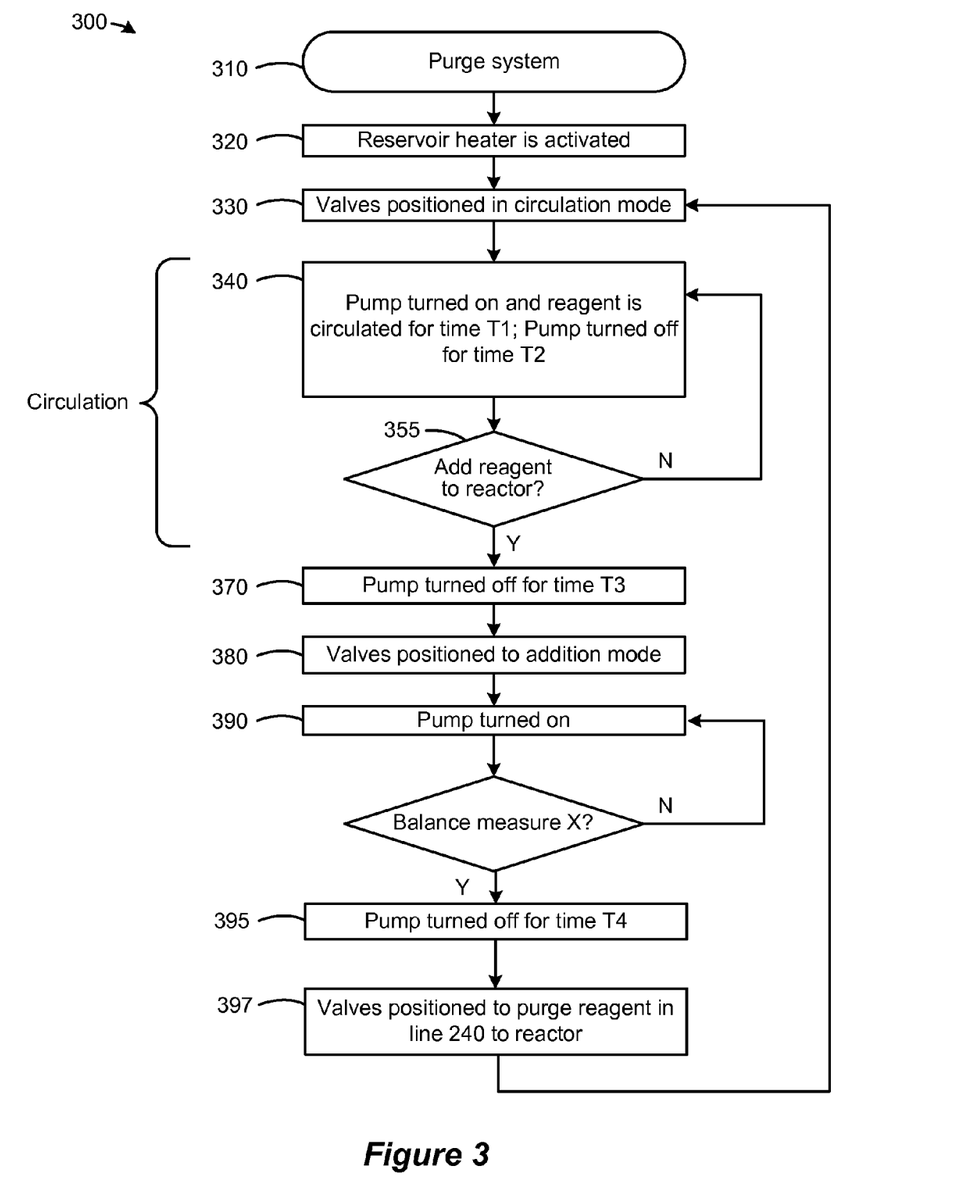
FIG. 3 is a flow diagram of an embodiment of the disclosed system that uses a scale.

FIG. 3 describes a control process flow of system 205 where a scale measurement 290a measures the weight of the fluid in the reservoir 250. Initially, the system may be purged of oxygen and moisture (310) by placing the valves into circulation mode (valves 215, 218 both placed in position A). Inert gas may then be introduced and the pump run until the system is purged. The addition side of the system may also be purged in a similar manner by switching valve 218 to the B position.

Once the system is purged, heater 260 may be activated and the fluid heated and stirred as described above (320) with the valve system 210 positioned in circulation mode (330). To maintain a temperature of the fluid and to prevent blockages of the delivery lines, the fluid in the supply and return lines may be circulated. For circulation of the fluid, the pump 120 may be turned on for a time interval T1 and then turned off for a time interval T2 (340). Time intervals T1 and T2 may be adjusted to ensure that the contents of lines 160, 220 and 240 remain mobile. For certain slurries, for example, T1 may be five minutes and T2 may be fifteen minutes. In other words, every twenty minutes, the slurry will circulate for five minutes. This circulation may be continued until an operator (or automated control system) determines that the fluid should be added to the reactor (355).

After the decision to add fluid to the reservoir is made, the pump may be turned off for a time interval T3 (370) to allow the system to stabilize before positioning the valves into addition mode (i.e., valve 215 in the A position and valve 218 in the B position). T3 may be twenty seconds for example. The pump 120 may then be activated (290) and, in one embodiment, feedback from the scale 270 will indicate when an appropriate amount of delivery fluid (by mass) has been added as described above. Once the desired amount of delivery fluid is added, the pump 120 may be turned off for a time interval T4 (395) to allow the system to stabilize and to allow for the valve system 210 to reconfigure into circulation mode. The valve system may then be configured with both valve 215 and valve 218 in the B position (397) to purge delivery line 240 of fluid before switching valve system 210 to the recirculation state—i.e., with both valve 215 and valve 218 in the A position. The process may then be repeated any desired number of times.

In yet other embodiments, a mass flow meter such as a Coriolis mass flow meter, for example, may be used to measure the quantity of reactant slurry or solution delivered to the reactor. In certain embodiments, the mass flow meter may be placed in delivery line 240.

Figure 4:
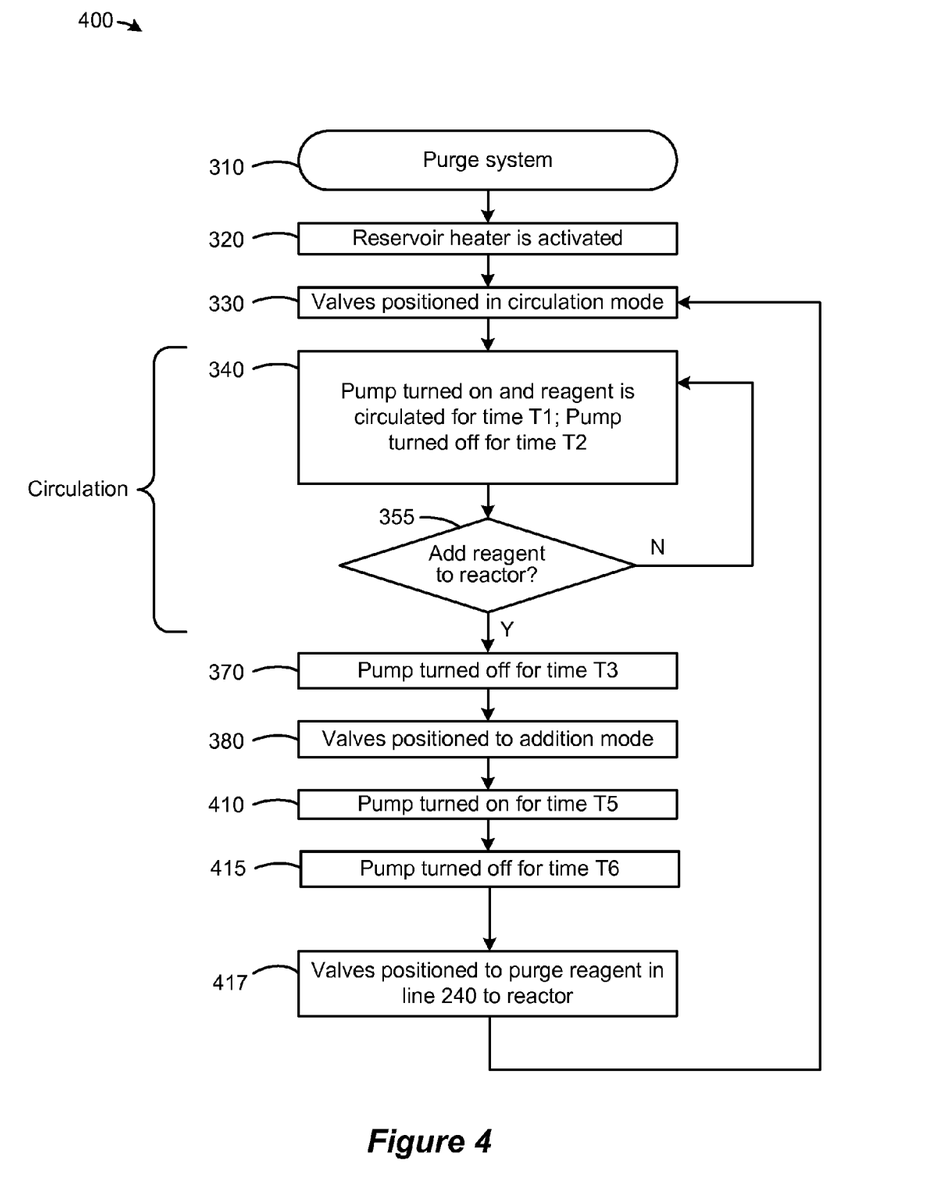
FIG. 4 is a flow diagram of an embodiment of the disclosed system that uses pump timing to deliver a desired quantity of reagents.

Another method for supplying the desired amount of fluid to reactor 100 is shown in flow diagram 400 of FIG. 4. Steps 310 through 380 are the same as those described above in connection with flow diagram 300. However the process depicted in flow diagram 400 uses the flow rate of pump 120 to accurately control the addition of delivery fluid to the reservoir 100 during addition mode. Here, the pump may be run for a pre-determined amount of time T5 (410) instead of weighing the delivery fluid. Once the desired amount of delivery fluid is added, the pump 120 may be turned off for a time interval T6 (415) to allow the system to stabilize. The valve system may then be configured with both valve 215 and valve 218 in the B position (417) to purge delivery line 240 of fluid before switching valve system 210 to the recirculation state—i.e., with both valve 215 and valve 218 in the A position. As with the embodiment of flow diagram 300, the process of flow diagram 400 may be repeated any desired number of times. For certain positive displacement pumps, the flow rate may be derived from the cycle time of the pump. Alternatively, for certain types of pumps, the total volume supplied by the pump may be derived from the number of cycles of the pump.

While the reactor system disclosed herein may be particularly suitable for the synthesis of quantum dot materials, it will be appreciated that the system may also be suitable for any process in which it may be necessary to transfer a slurry from one vessel to another while maintaining temperature control. Moreover, it will be appreciated that many configurations for providing circulation of a slurry are possible and the scope of the invention is not limited to the specific configurations of valves, lines, and vessels described herein.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. An apparatus comprising:
   a reactor;
   a reservoir;
   a heater in thermal contact with the reservoir;
   a pump;
   a valve assembly having a first 3-port valve and a second 3-port valve;
   a first transparent supply line in fluid communication with the reservoir at a first end thereof and with the pump at a second end thereof;
   a second transparent supply line in fluid communication with the pump at a first end thereof and with the valve assembly at a second end thereof;
   a delivery line in fluid communication with the valve assembly at a first end thereof and with the reactor at a second end thereof;
   a transparent return line in fluid communication with the valve assembly at a first end thereof and with the reservoir at a second end thereof;
   wherein the valve assembly is configured such that in a first state the valve assembly provides fluid communication from the reservoir to the reactor via the first supply line, the pump, the second supply line, and the delivery line and, in a second state, provides recirculation of the contents of the reservoir via the first supply line, the pump, the second supply line, and the return line.

2. The apparatus recited in claim 1 further comprising:
   a source of inert gas;
   a purge line in fluid communication with the source of inert gas at a first end thereof and with the valve assembly at a second end thereof;
   wherein the valve assembly is configured such that in a third state the valve assembly provides fluid communication between the source of inert gas and the reactor via the purge line and the delivery line.

3. The apparatus recited in claim 2 further wherein the valve assembly is configured such that in a fourth state the valve assembly provides fluid communication between the source of inert gas and the reservoir via the purge line and the return line.

4. The apparatus recited in claim 1 wherein the first supply line is contiguous with the second supply line and the pump is a peristaltic pump.

5. The apparatus recited in claim 1 further comprising: means for stirring the contents of the reservoir.

6. The apparatus recited in claim 5 wherein the means for stirring the contents of the reservoir is a magnetic stirrer.

7. The apparatus recited in claim 6 wherein the magnetic stirrer is housed within the heater.

8. The apparatus recited in claim 1 wherein a common port of the first 3-port valve is in fluid communication with a common port of the second 3-port valve.

9. The apparatus recited in claim 1 further comprising: a scale configured to weigh the contents of the reservoir.

10. The apparatus recited in claim 1 further comprising: a timer configured to control the pump and the valve assembly.

11. The apparatus recited in claim 1 further comprising: a timer configured to control the pump, the valve assembly, and the heater.

12. The apparatus recited in claim 11 further comprising: means for stirring the contents of the reservoir; and, wherein the timer is configured to additionally control the means for stirring the contents of the reservoir.

13. The apparatus recited in claim 1 wherein the delivery line is transparent.

14. An apparatus comprising:
a reactor;
a reservoir;
a heater in thermal contact with the reservoir;
a pump;
a valve assembly having a first 3-port valve and a second 3-port valve;
a first transparent supply line in fluid communication with the reservoir at a first end thereof and with the pump at a second end thereof;
a second transparent supply line in fluid communication with the pump at a first end thereof and with the valve assembly at a second end thereof;
a delivery line in fluid communication with the valve assembly at a first end thereof and with the reactor at a second end thereof;
a transparent return line in fluid communication with the valve assembly at a first end thereof and with the reservoir at a second end thereof;
at least one temperature sensor in thermal contact with at least one of the reactor, the first supply line, the second supply line, the valve assembly, and the return line;
a processor-based system in data communication with the at least one temperature sensor and configured to control the heater, the pump, and the valve assembly;
wherein the valve assembly is configured such that in a first state the valve assembly provides fluid communication from the reservoir to the reactor via the first supply line, the pump, the second supply line, and the delivery line and, in a second state, provides recirculation of the contents of the reservoir via the first supply line, the pump, the second supply line, and the return line.

15. The apparatus recited in claim 14 further comprising a medium storing instructions for causing the processor-based system to:
position the valve assembly in the second state; and,
actuate the heater and the pump so as to maintain a preselected minimum temperature in at least one of the group consisting of the first supply line, the second supply line and the return line.

16. The apparatus recited in claim 14 further comprising a scale in data communication with the processor-based system and configured to weigh the contents of the reservoir.

17. The apparatus recited in claim 16 further comprising a medium storing instructions for causing the processor-based system to:
position the valve assembly in the first state; and,
actuate the pump so as to supply a preselected quantity by weight of the contents of the reservoir to the reactor.

18. The apparatus recited in claim 14 further comprising:
a heat exchanger in fluid communication with the first transparent supply line.

19. A method for maintaining a slurry of reactants in a fluid state comprising:
providing:
a reactor;
a reservoir contain a slurry of reactants;
a heater in thermal contact with the reservoir;
a pump;
a valve assembly having a first 3-port valve and a second 3-port valve;
a first transparent supply line in fluid communication with the reservoir at a first end thereof and with the pump at a second end thereof;
a second transparent supply line in fluid communication with the pump at a first end thereof and with the valve assembly at a second end thereof;
a delivery line in fluid communication with the valve assembly at a first end thereof and with the reactor at a second end thereof;
a transparent return line in fluid communication with the valve assembly at a first end thereof and with the reservoir at a second end thereof;
wherein the valve assembly is configured such that in a first state the valve assembly provides fluid communication from the reservoir to the reactor via the first supply line, the pump, the second supply line, and the delivery line and, in a second state, provides recirculation of the contents of the reservoir via the first supply line, the pump, the second supply line, and the return line;
visually monitoring the slurry of reactants in the first transparent supply line, the second transparent supply line and the transparent return line;
positioning the valve assembly into the second state; and,
actuating the heater and the pump to recirculate the heated slurry of reactants from the reservoir through the first supply line, the pump, the second supply line, the valve assembly, and the return line back to the reservoir.

20. An apparatus comprising:
a reactor;
a reservoir;
a heater in thermal contact with the reservoir;
a pump;
a valve assembly;
a source of inert gas;
a purge line in fluid communication with the source of inert gas at a first end thereof and with the valve assembly at a second end thereof;
a first transparent supply line in fluid communication with the reservoir at a first end thereof and with the pump at a second end thereof;
a second transparent supply line in fluid communication with the pump at a first end thereof and with the valve assembly at a second end thereof;
a delivery line in fluid communication with the valve assembly at a first end thereof and with the reactor at a second end thereof;
a transparent return line in fluid communication with the valve assembly at a first end thereof and with the reservoir at a second end thereof;
wherein the valve assembly is configured such that in a first state the valve assembly provides fluid communication from the reservoir to the reactor via the first supply line, the pump, the second supply line, and the delivery line and, in a second state, provides recirculation of the contents of the reservoir via the first supply line, the pump, the second supply line, and the return line, and
wherein the valve assembly is configured such that in a third state the valve assembly provides fluid communication between the source of inert gas and the reactor via the purge line and the delivery line.

* * * * *